US012754484B2

(12) United States Patent
Ben-Harush et al.

(10) Patent No.: US 12,754,484 B2
(45) Date of Patent: Oct. 6, 2026

(54) MACHINE LEARNING BASED METROLOGY FOR SEMICONDUCTOR SPECIMENS

(71) Applicant: Applied Materials Israel Ltd., Rehovot (IL)

(72) Inventors: Ilan Ben-Harush, Tel-Aviv (IL); Rafael Bistritzer, Petach Tikva (IL); Yehoshua Cohen, Tel-Aviv (IL)

(73) Assignee: Applied Materials Israel Ltd., Rehovot (IL)

( * ) Notice: Subject to any disclaimer, the term of this patent is extended or adjusted under 35 U.S.C. 154(b) by 631 days.

(21) Appl. No.: 18/215,083

(22) Filed: Jun. 27, 2023

(65) Prior Publication Data

US 2025/0004386 A1 Jan. 2, 2025

(51) Int. Cl.
*G06F 18/2111* (2023.01)
*G03F 7/00* (2006.01)
(Continued)

(52) U.S. Cl.
CPC .. *G03F 7/706841* (2023.05); *G03F 7/706837* (2023.05); *G03F 7/706843* (2023.05); (Continued)

(58) Field of Classification Search
CPC ......... G03F 7/706841; G03F 7/706843; G03F 7/706837; G06F 18/2111; G06F 30/27; G06F 30/398; G06F 2119/02; G06F 2119/18; G06F 2119/20; G06F 2119/22
USPC ........... 716/54, 55; 703/14; 700/97, 98, 108, 700/119, 120, 121; 382/145, 154, 156, 382/157; 378/34, 35
See application file for complete search history.

(56) References Cited

U.S. PATENT DOCUMENTS 7,149,345 B2 * 12/2006 Fujiwara ................. G06T 7/596 348/42
11,276,247 B1 * 3/2022 Delgado ............... G06T 19/003
(Continued)

FOREIGN PATENT DOCUMENTS

CN 117726895 A * 3/2024 ............ H10P 74/203

OTHER PUBLICATIONS

Borkowski et al., "Matching 2D Image Segments with Genetic Algorithms and Approximation Spaces", Transactions on Rough Sets V, LNCS 4100, 2006, pp. 63-101. (Year: 2006).*
(Continued)

*Primary Examiner* — Phallaka Kik
(74) *Attorney, Agent, or Firm* — Lowenstein Sandler LLP

(57) ABSTRACT

There is provided a system and method for examining a semiconductor specimen. The method includes obtaining a runtime image of a semiconductor specimen acquired by an examination tool; processing the runtime image to create one or more image strips each containing an edge, and for each image strip, extracting a sequence of topo points representative of a contour of the edge therein; providing the sequence of topo points for each image strip to a trained machine learning (ML) model to be processed, and obtaining, as an output of the ML model, a sequence of updated topo points; and obtaining measurement data on the runtime image using the sequence of updated topo points, wherein the measurement data has improved performance with respect to at least one metrology metric.

20 Claims, 5 Drawing Sheets

(51) Int. Cl.
*G06F 30/27* (2020.01)
*G06F 30/398* (2020.01)
*G06F 119/02* (2020.01)
*G06F 119/18* (2020.01)
*G06F 119/20* (2020.01)
*G06F 119/22* (2020.01)

(52) U.S. Cl.
CPC .......... *G06F 18/2111* (2023.01); *G06F 30/27* (2020.01); *G06F 30/398* (2020.01); *G06F 2119/02* (2020.01); *G06F 2119/18* (2020.01); *G06F 2119/20* (2020.01); *G06F 2119/22* (2020.01)

(56) References Cited

U.S. PATENT DOCUMENTS

| | | | | |
|---|---|---|---|---|
| 11,580,375 | B2* | 2/2023 | Bhaskar | G06N 3/08 |
| 2017/0193400 | A1* | 7/2017 | Bhaskar | G06N 3/08 |
| 2023/0147722 | A1* | 5/2023 | Ramirez de Chanlatte | G06N 3/0442 345/419 |
| 2023/0306580 | A1* | 9/2023 | Ben-Shlomo | G06T 7/0004 |
| 2024/0281958 | A1* | 8/2024 | Levant | G06T 7/001 |
| 2024/0338811 | A1* | 10/2024 | Ofir | G06T 7/001 |
| 2024/0377343 | A1* | 11/2024 | Guo | G01N 23/2251 |

OTHER PUBLICATIONS

Jiang et al., "A Computational-Geometry Approach to Digital Image Contour Extraction", Trans. on Comput. Sci. XIII, LNCS 6750, pp. 13-43, 2011, Springer-Verlag Berlin Heidelberg. (Year: 2011).*

* cited by examiner

MACHINE LEARNING BASED METROLOGY FOR SEMICONDUCTOR SPECIMENS

TECHNICAL FIELD

The presently disclosed subject matter relates, in general, to the field of examination of a semiconductor specimen, and more specifically, to machine learning based metrology applications of the specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally, or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc.

Automated examination systems ensure that the parts manufactured meet the quality standards expected and provide useful information on adjustments that may be needed to the manufacturing tools, equipment, and/or compositions, depending on the type of defects identified.

In some cases, machine learning technologies can be used to assist the automated examination process so as to promote higher yield. For instance, supervised machine learning can be used to enable accurate and efficient solutions for automating specific examination applications based on sufficiently annotated training images.

SUMMARY

In accordance with certain aspects of the presently disclosed subject matter, there is provided a computerized metrology system for examining a semiconductor specimen, the system comprising a processing circuitry configured to obtain a runtime image of a semiconductor specimen acquired by an examination tool; process the runtime image to create one or more image strips each containing an edge, and, for each image strip, extract a sequence of topo points representative of a contour of the edge therein; provide the sequence of topo points for each image strip to a trained machine learning (ML) model to be processed, and obtain, as an output of the ML model, a sequence of updated topo points; and obtain measurement data on the runtime image using the sequence of updated topo points, wherein the measurement data has improved performance with respect to at least one metrology metric.

In addition to the above features, the system according to this aspect of the presently disclosed subject matter can comprise one or more of features (i) to (x) listed below, in any desired combination or permutation which is technically possible:

(i). The at least one metrology metric is from a group comprising matching, precision, correlation, and sensitivity.

(ii). The processing comprises identifying one or more edges from the runtime image, and for each edge, cropping a set of image patches along a set of perpendicular lines with respect to the edge, and combining the set of image patches to form an image strip containing the edge.

(iii). The extracting comprises for each image strip, generating a plurality of gray level (GL) profiles across the image strip, and for each GL profile, identifying a location with largest derivative along the GL profile corresponding to a topo point on the contour of the edge.

(iv). The ML model is previously trained during a training phase using a training set comprising a plurality of training images collected from at least one examination tool.

(v). The training of the ML model comprises, for each training image: processing the training image to create one or more training image strips each containing an edge, and for each training image strip, extracting a sequence of topo points representative of a contour of the edge; providing the sequence of topo points to the ML model to process, and obtaining a sequence of predicted topo points; obtaining predicted measurement data using the sequence of predicted topo points; and evaluating the predicted measurement data using a loss function representative of the at least metrology metric, and optimizing the ML model until the loss function meets a predefined criterion.

(vi). The processing comprises performing image registration between the runtime image and a training image, the training image being associated with one or more locations of one or more edges identified during training, and creating the one or more image strips from the runtime image based on the one or more locations in the training image.

(vii). The improved performance of the measurement data is with respect to measurement data obtained using the sequence of topo points.

(viii). The improved performance of the measurement data further comprises robustness and interpretability with respect to measurement data obtained using an end-to-end learning model.

(ix). The precision is indicative of repeatability of predicted measurement data of different training images acquired for a given feature on the specimen by one metrology tool. The correlation is between predicted measurement data of the training images and respective ground truth measurement data associated therewith. The matching is indicative of repeatability of predicted measurement data of different training images acquired for the given feature by different metrology tools. The sensitivity is indicative of how sensitive the predicted measurement data is with respect to changes of sizes of the given feature.

(x). The ML model is trained for a specific metrology application from a group comprising Critical Dimension (CD) metrology, Overlay (OVL), Measurement-Based Inspection (MBI), Critical Dimension Uniformity (CDU), CAD Awareness (CADA), and lithography process control.

In accordance with other aspects of the presently disclosed subject matter, there is provided a computerized method of examining a semiconductor specimen, the method comprising: obtaining a runtime image of a semiconductor specimen acquired by an examination tool; processing the runtime image to create one or more image strips each containing an edge, and for each image strip, extracting a sequence of topo points representative of a contour of the edge therein; providing the sequence of topo points for each image strip to a trained machine learning (ML) model to be processed, and obtaining, as an output of the ML model, a sequence of updated topo points; and obtaining measurement data on the runtime image using the sequence of updated topo points, wherein the measurement data has improved performance with respect to at least one metrology metric.

In accordance with other aspects of the presently disclosed subject matter, there is provided a computerized method of training a machine learning model usable for examining a semiconductor specimen, the method comprising: obtaining a plurality of training images collected from at least one metrology tool; for each training image, processing the training image to create one or more training image strips each containing an edge, and for each training image strip, extracting a sequence of topo points representative of a contour of the edge; providing the sequence of topo points to the ML model to process and obtaining a sequence of predicted topo points; obtaining predicted measurement data using the sequence of predicted topo points; and evaluating the predicted measurement data using a loss function representative of the at least metrology metric, and optimizing the ML model until the loss function meets a predefined criterion.

These aspects of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a computerized metrology method for examining a semiconductor specimen, the method comprising: obtaining a runtime image of a semiconductor specimen acquired by an examination tool; processing the runtime image to create one or more image strips each containing an edge, and for each image strip, extracting a sequence of topo points representative of a contour of the edge therein; providing the sequence of topo points for each image strip to a trained machine learning (ML) model to be processed, and obtaining, as an output of the ML model, a sequence of updated topo points; and obtaining measurement data on the runtime image using the sequence of updated topo points, wherein the measurement data has improved performance with respect to at least one metrology metric.

In accordance with other aspects of the presently disclosed subject matter, there is provided a non-transitory computer readable medium comprising instructions that, when executed by a computer, cause the computer to perform a computerized method of training a machine learning model usable for examining a semiconductor specimen, the method comprising: obtaining a plurality of training images collected from at least one metrology tool; for each training image, processing the training image to create one or more training image strips each containing an edge, and for each training image strip, extracting a sequence of topo points representative of a contour of the edge; providing the sequence of topo points to the ML model to process and obtaining a sequence of predicted topo points; obtaining predicted measurement data using the sequence of predicted topo points; and evaluating the predicted measurement data using a loss function representative of the at least metrology metric, and optimizing the ML model until the loss function meets a predefined criterion.

These aspects of the disclosed subject matter can comprise one or more of features (i) to (x) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
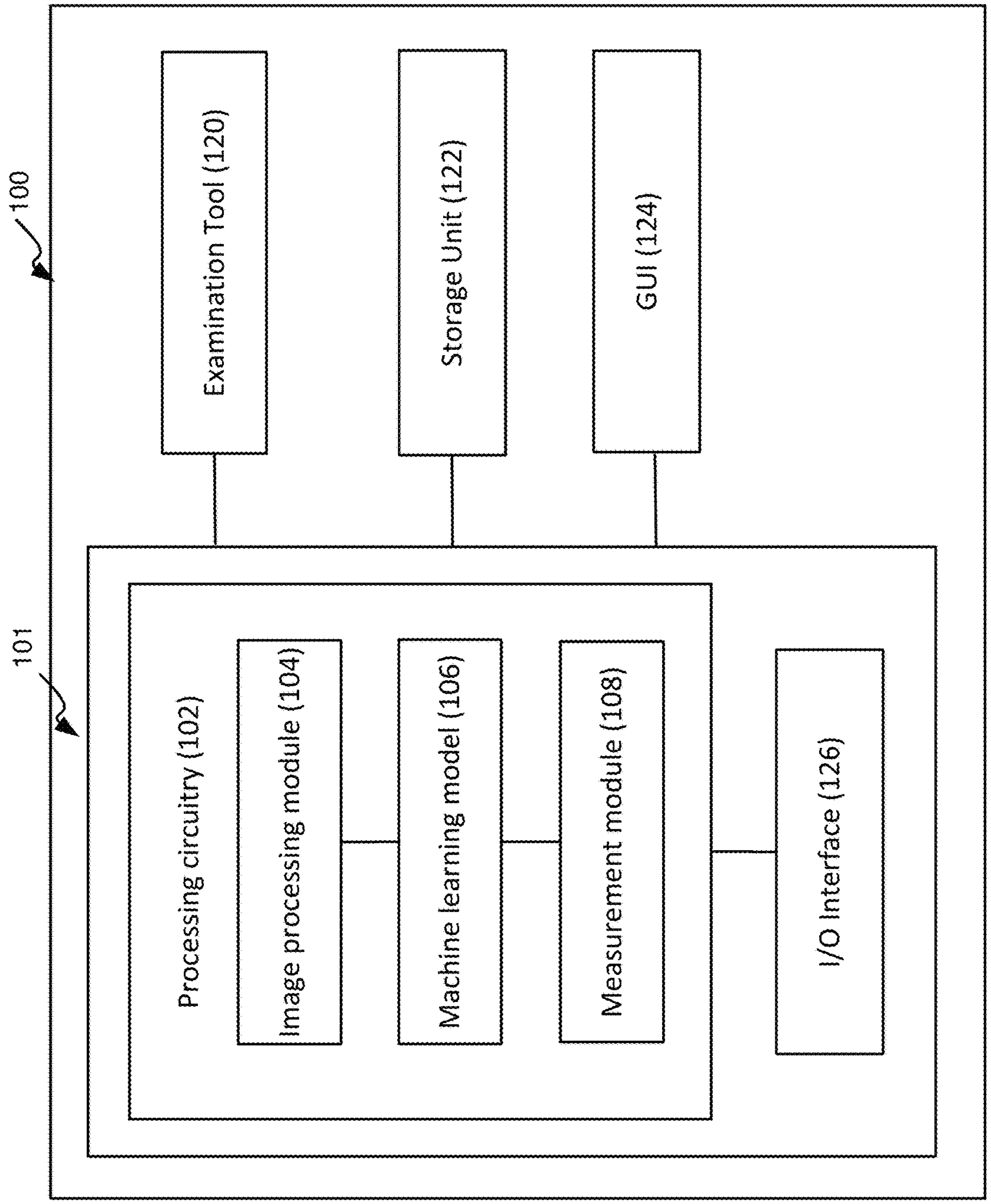
FIG. 1 illustrates a generalized block diagram of an examination system in accordance with certain embodiments of the presently disclosed subject matter.

The process of semiconductor manufacturing often requires multiple sequential processing steps and/or layers, each one of which could possibly cause errors that may lead to yield loss. Examples of various processing steps can include lithography, etching, depositing, planarization, growth (such as, e.g., epitaxial growth), and implantation, etc. Various examination operations, such as defect-related examination, and/or metrology-related examination, can be performed at different processing steps/layers during the manufacturing process to monitor and control the process. The examination operations can be performed a multiplicity of times, for example after certain processing steps, and/or after the manufacturing of certain layers, or the like.

By way of example, metrology operations can be used to measure one or more characteristics of the specimen, such as, e.g., CD measurements (e.g., line width, thickness, etc.) of features formed on the specimen during a processing step, such that the performance of the processing step can be evaluated based on the measurements. For instance, if some of the measurements of the specimen are unacceptable (e.g., exceeding a predetermined range or threshold), such measurements may be used to alter one or more parameters of the processing step such that subsequent specimens manufactured by the processing step can have acceptable characteristics.

Conventionally, a metrology system typically processes the captured images of a specimen to identify edges, and derives measurements based on the edge information. The measurements are evaluated with respect to certain metrology benchmarks or metrics, such as, e.g., precision, matching, sensitivity, and/or correlation (which can be predetermined by customers). Such a conventional metrology system is also referred to herein as a legacy metrology system.

As semiconductor fabrication processes continue to advance, semiconductor devices are developed with increasingly complex structures with shrinking feature dimensions, which makes it more challenging for a conventional metrology system to meet the metrology metrics.

Taking matching as an example, matching refers to a metrology metric/benchmark representative of measurement variance between different tools, therefore is also referred to as tool-to-tool matching. Matching is thus related to the repeatability of measurement data from different images of the same given feature acquired by different metrology tools. By way of example, the matching spec requirement for a given present technology node (also referred to as process node, i.e., a specific generation of chips made in accordance with specific design rules) can be in the sub-nanometer regime, which, in the next few generations of technology nodes, may shrink further, such as, e.g., into the sub-angstrom regime. The conventional metrology system as described above is unlikely to meet such high matching requirement.

Accordingly, certain embodiments of the presently disclosed subject matter propose to use a machine-learning based metrology system to replace or optimize at least part of the legacy metrology system, which does not have one or more of the disadvantages described above. The present disclosure proposes to preprocess a runtime image to extract topo points representative of edges therein, and use a trained machine learning (ML) model to process the topo points and obtain updated topo points. The updated topo points, when being used for obtaining measurement data on the runtime image, can result in improved measurement performance with respect to at least one metrology metric, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification, segmentation, and/or metrology operations, such as, e.g., critical dimension (CD) measurements, roughness, overlay, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning (in a single or in multiple scans), imaging, sampling, reviewing, measuring, classifying and/or other processes provided with regard to the specimen or parts thereof.

Without limiting the scope of the disclosure in any way, it should also be noted that the examination tools 120 can be implemented as inspection machines of various types, such as optical inspection machines, electron beam inspection machines (e.g., Scanning Electron Microscope (SEM), Atomic Force Microscopy (AFM), or Transmission Electron Microscope (TEM), etc.), and so on. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools.

In some embodiments, at least one of the examination tools 120 has metrology capabilities and can be configured to capture images and perform metrology operations on the captured images. Such an examination tool is also referred to herein as a metrology tool.

According to certain embodiments, the metrology tool can be an electron beam tool, such as, e.g., scanning electron microscopy (SEM). SEM is a type of electron microscope that produces images of a specimen by scanning the specimen with a focused beam of electrons. The electrons interact with atoms in the specimen, producing various signals that contain information on the surface topography and/or composition of the specimen. SEM is capable of accurately measuring features during the manufacture of semiconductor wafers. By way of example, the metrology tool can be critical dimension scanning electron microscopes (CD-SEM) used to measure critical dimensions of structural features in the images.

According to certain embodiments of the presently disclosed subject matter, the examination system 100 comprises a computer-based system 101 operatively connected to the examination tools 120 and capable of enabling automatic metrology operations with respect to a semiconductor specimen in runtime, based on runtime images obtained during specimen fabrication. System 101 is also referred to as a metrology system.

System 101 includes a processing circuitry 102 operatively connected to a hardware-based I/O interface 126 and configured to provide processing necessary for operating the system, as further detailed with reference to FIGS. 2-5. The processing circuitry 102 can comprise one or more processors (not shown separately) and one or more memories (not shown separately). The one or more processors of the processing circuitry 102 can be configured, either separately or in any appropriate combination, to execute several functional modules in accordance with computer-readable instructions implemented on a non-transitory computer-readable memory comprised in the processing circuitry. Such functional modules are referred to hereinafter as comprised in the processing circuitry.

The one or more processors referred to herein can represent one or more general-purpose processing devices such as a microprocessor, a central processing unit, or the like. More particularly, a given processor may be one of: a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., and main memory such as, e.g., read-only memory (ROM), flash memory, dynamic random access memory (DRAM) such as synchronous DRAM (SDRAM) or Rambus DRAM (RDRAM), etc.

According to certain embodiments of the presently disclosed subject matter, system 101 can be a metrology system configured to perform metrology operations using a trained machine learning (ML) model based on runtime images obtained during specimen fabrication. In such cases, one or more functional modules comprised in the processing circuitry 102 of system 101 can include an image processing module 104, a machine learning (ML) model 106 that was previously trained, and a measurement module 108.

Specifically, the processing circuitry 102 can be configured to obtain, via an I/O interface 126, a runtime image of a semiconductor specimen acquired by an examination tool. The image processing module 104 can be configured to process the runtime image to create one or more image strips each containing an edge, and for each image strip, extract a sequence of topo points representative of a contour of the edge. The sequence of topo points for each image strip can be processed by a trained ML model 106. Upon processing, a sequence of updated topo points can be provided as an output of the ML model 106. The measurement module 108 can be configured to obtain measurement data on the runtime image using the sequence of updated topo points. The measurement data can be obtained for a specific metrology application. The measurement data can have improved performance in terms of at least one metrology metric.

In such cases, the functional modules 104-108 can be regarded as being comprised in a metrology recipe usable for performing metrology operations for a specific metrology application based on acquired runtime images. System 101 can be regarded as a metrology system capable of performing runtime metrology operations using the metrology recipe. Details of the runtime examination process are described below with reference to FIG. 2.

In some embodiments, system 101 can be configured as a training system capable of training the ML model during a training/setup phase using a specifically generated training set and cost functions. In such cases, one or more functional modules comprised in the processing circuitry 102 of system 101 can include a training module (not illustrated) and a ML model 106. Specifically, the training module can be configured to obtain a training set comprising a plurality of training images of the specimen, and, optionally, respective ground truth measurement data associated therewith. The training module can be configured to train the ML model 106 using the training set and one or more loss functions. The cost functions can be specifically configured to evaluate predicted measurement data obtained using the ML learning model, with respect to one or more metrology benchmarks such as, e.g., precision, correlation, sensitivity and/or matching etc. As described above, the ML model, upon being trained, is usable for processing a runtime image, and obtaining measurement data therefrom. Details of the training process are described below with reference to FIG. 5.

According to certain embodiments, the ML model can be trained for different metrology applications, based on specific training images and ground truth data pertaining to respective applications. Various applications that can be applicable using the present disclosure include, but are not limited to, the following: a critical dimension (CD) metrology application, an overlay application, etc., as detailed below.

Operation of systems 100 and 101, the processing circuity 102, and the functional modules therein will be further detailed with reference to FIGS. 2-5.

According to certain embodiments, the ML model 106 referred to herein can be implemented as various types of machine learning models, such as, e.g., decision tree, Support Vector Machine (SVM), Artificial Neural Network (ANN), regression model, Bayesian network, etc., or ensembles/combinations thereof. The learning algorithm used by the ML model can be any of the following: supervised learning, unsupervised learning, or semi-supervised learning, etc. The presently disclosed subject matter is not limited to the specific type of ML model or the specific type of learning algorithm used by the ML model.

In some embodiments, the ML model can be implemented as a deep neural network (DNN). DNN can comprise multiple layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE), typically referred to in the art as dimensions, neurons, or nodes.

The weighting and/or threshold values associated with the CEs of a deep neural network and the connections thereof can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a deep neural network is referred to as a training set.

It is noted that the teachings of the presently disclosed subject matter are not bound by specific architecture of the ML or DNN as described above.

It is to be noted that while certain embodiments of the present disclosure refer to the processing circuitry 102 being configured to perform the above recited operations, the functionalities/operations of the aforementioned functional modules can be performed by the one or more processors in processing circuitry 102 in various ways. By way of example, the operations of each functional module can be performed by a specific processor, or by a combination of processors. The operations of the various functional modules, such as processing the runtime image, extracting the sequence of topo points, providing the sequence of topo points for each image strip to a trained ML model to be processed, and obtaining the measurement data, etc., can thus be performed by respective processors (or processor combinations) in the processing circuitry 102, while, optionally, these operations may be performed by the same processor. The present disclosure should not be limited to being construed as one single processor always performing all the operations.

In some cases, additionally to system 101, the examination system 100 can comprise one or more examination modules, such as, e.g., metrology operation module, defect detection module, Automatic Defect Review Module (ADR), Automatic Defect Classification Module (ADC), and/or other examination modules which are usable for examination of a semiconductor specimen. The one or more examination modules can be implemented as stand-alone computers, or their functionalities (or at least part thereof) can be integrated with the examination tool 120. In some cases, the output of system 101, e.g., the trained ML model, the sequence of updated topo points, the measurement data, can be provided to the one or more examination modules for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120, such as, e.g., the runtime images, the training set, as described above. Accordingly, these input data can be retrieved from the storage unit 122 and provided to the processing circuitry 102 for further processing. The output of the system 101, such as, e.g., the trained ML model, the sequence of updated topo points, and/or the measurement data, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the images of the specimen, etc. The user may be provided, through the GUI, with options of defining certain operation parameters. The user may also view the operation results or intermediate processing results, such as, e.g., the sequence of updated topo points, the measurement data, etc., on the GUI.

In some cases, system 101 can be further configured to send, via I/O interface 126, the operation results to the examination tool 120 for further processing. In some cases, system 101 can be further configured to send the results to the storage unit 122, and/or external systems (e.g., Yield Management System (YMS) of a fabrication plant (fab)). A yield management system (YMS) in the context of semiconductor manufacturing is a data management, analysis, and tool system that collects data from the fab, especially during manufacturing ramp ups, and helps engineers find ways to improve yield. YMS helps semiconductor manufacturers and fabs manage high volumes of production analysis with fewer engineers. These systems analyze the yield data and generate reports. YMS can be used by Integrated Device Manufacturers (IMD), fabs, fabless semiconductor companies, and Outsourced Semiconductor Assembly and Test (OSAT).

Those versed in the art will readily appreciate that the teachings of the presently disclosed subject matter are not bound by the system illustrated in FIG. 1. Each system component and module in FIG. 1 can be made up of any combination of software, hardware, and/or firmware, as relevant, executed on a suitable device or devices, which perform the functions as defined and explained herein. Equivalent and/or modified functionality, as described with respect to each system component and module, can be consolidated or divided in another manner. Thus, in some embodiments of the presently disclosed subject matter, the system may include fewer, more, modified and/or different components, modules, and functions than those shown in FIG. 1.

Each component in FIG. 1 may represent a plurality of the particular component, which are adapted to independently and/or cooperatively operate to process various data and electrical inputs, and for enabling operations related to a computerized examination system. In some cases, multiple instances of a component may be utilized for reasons of performance, redundancy, and/or availability. Similarly, in some cases, multiple instances of a component may be utilized for reasons of functionality or application. For example, different portions of the particular functionality may be placed in different instances of the component.

It should be noted that the examination system illustrated in FIG. 1 can be implemented in a distributed computing environment, in which one or more of the aforementioned components and functional modules shown in FIG. 1 can be distributed over several local and/or remote devices. By way of example, the examination tool 120 and the system 101 can be located at the same entity (in some cases hosted by the same device) or distributed over different entities, depending on specific system configurations and implementation needs. In some examples, certain components utilize a cloud implementation, e.g., are implemented in a private or public cloud. Communication between the various components of the examination system, in cases where they are not located entirely in one location or in one physical entity, can be realized by any signaling system or communication components, modules, protocols, software languages, and drive signals, and can be wired and/or wireless, as appropriate.

It should be further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules, as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operation of systems 101 and 100 can correspond to some or all of the stages of the methods described with respect to FIGS. 2-5. Likewise, the methods described with respect to FIGS. 2-5 and their possible implementations can be implemented by systems 101 and 100. It is therefore noted that embodiments discussed in relation to the methods described with respect to FIGS. 2-5 can also be implemented, mutatis mutandis as various embodiments of the systems 101 and 100, and vice versa.

Figure 2:
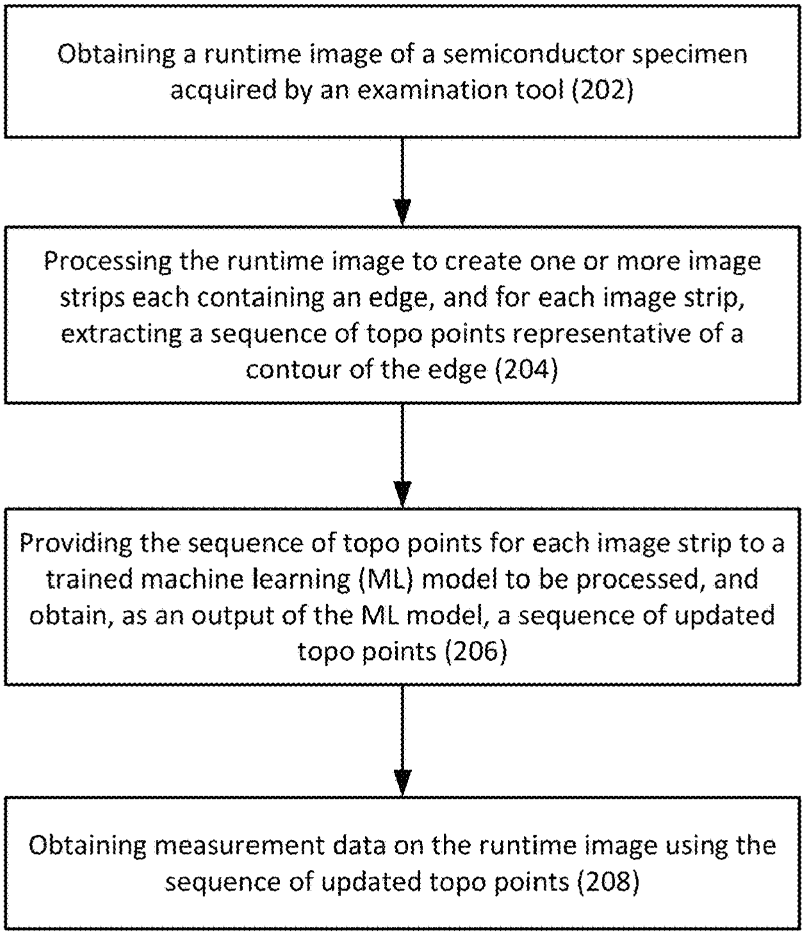
FIG. 2 illustrates a generalized flowchart of runtime examination of a semiconductor specimen using a trained ML model in accordance with certain embodiments of the presently disclosed subject matter.

Referring to FIG. 2, there is illustrated a generalized flowchart of runtime examination of a semiconductor specimen using a trained ML model in accordance with certain embodiments of the presently disclosed subject matter.

As described above, a semiconductor specimen is typically made of multiple layers. The examination process of a specimen can be performed a multiplicity of times during the fabrication process of the specimen, for example following the processing steps of specific layers. In some cases, a sampled set of processing steps can be selected for in-line examination, based on their known impacts on device characteristics or yield. Images of the specimen or parts thereof can be acquired at the sampled set of processing steps to be examined.

For the purpose of illustration only, certain embodiments of the following description are described with respect to images of a given processing step/layer of the sampled set of processing steps. Those skilled in the art will readily appreciate that the teachings of the presently disclosed subject matter, such as the process of machine-learning based examination, can be performed following any layer and/or processing steps of the specimen. The present disclosure should not be limited to the number of layers comprised in the specimen and/or the specific layer(s) to be examined.

A runtime image of a semiconductor specimen can be obtained (202) (e.g., acquired by the examination tool 120) during runtime examination of the specimen. A semiconductor specimen here can refer to a semiconductor wafer, a die, or parts thereof, that is fabricated and examined in the fab during a fabrication process thereof. An image of a specimen can refer to an image capturing at least part of the specimen. By way of example, an image can capture a target region or a target structure (e.g., a structural feature or pattern on a semiconductor specimen) that is of interest to be examined on a semiconductor specimen. For instance, the image can be an electron beam (e-beam) image acquired by an electron beam tool in runtime during in-line examination of the semiconductor specimen.

Figure 3:
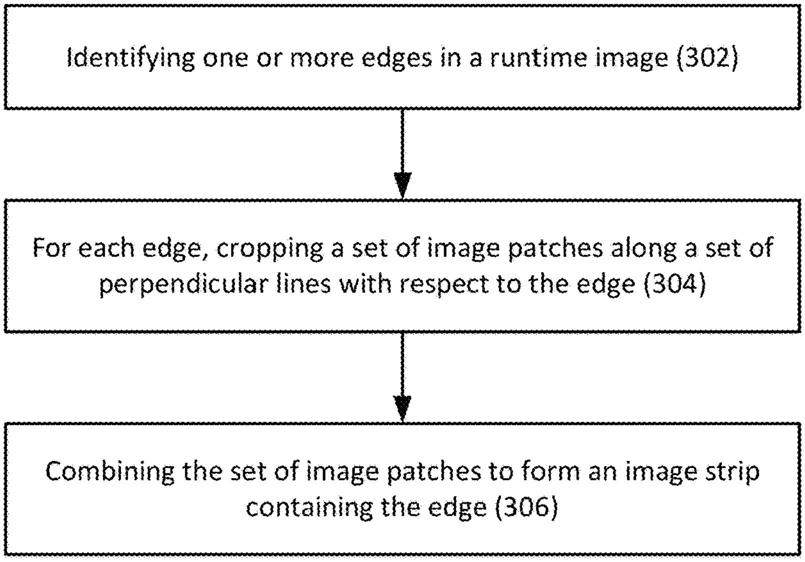
FIG. 3 illustrates a generalized flowchart of generating an image strip in accordance with certain embodiments of the presently disclosed subject matter.
Figure 4:
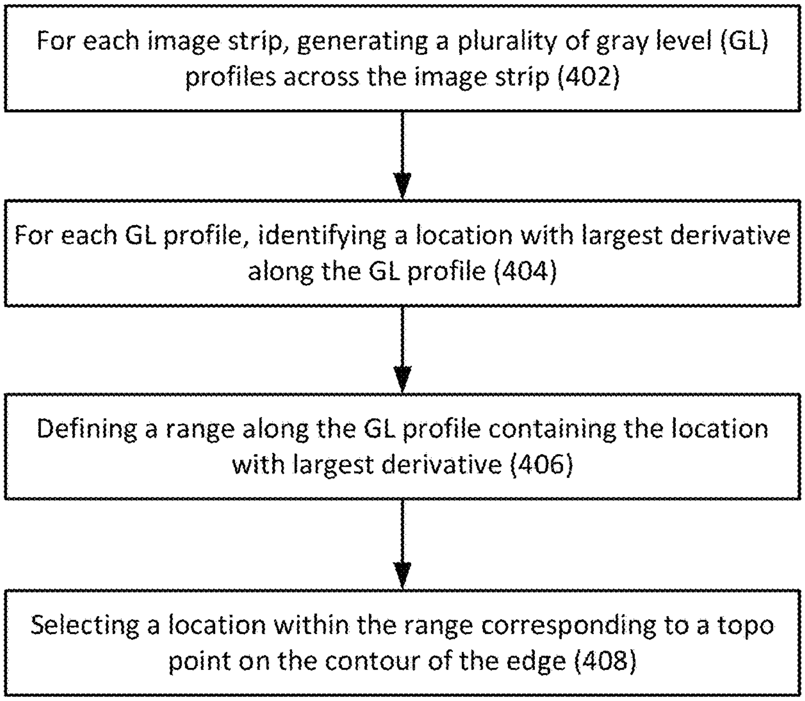
FIG. 4 illustrates a generalized flowchart of extracting a set of topo points in accordance with certain embodiments of the presently disclosed subject matter.

The runtime image can be processed (204) (e.g., by the image processing module 104) to create one or more image strips each containing an edge. For each image strip, a sequence of topo points can be extracted, representative of a contour of the edge. The term "topo point" can refer to a specific point or location on the topography of a semiconductor specimen where measurements or other metrology operations can be performed. It may be a point of interest that is selected for detailed examination, such as a location for a specific feature of the semiconductor specimen. The sequence of topo points extracted herein represent a contour of an edge in the image, including, such as, e.g., the bottom and top points of an edge. Various ways of image processing can be used for extracting topo points representative of an edge. FIGS. 3 and 4 demonstrate one possible way of extracting topo points.

FIG. 3 illustrates a generalized flowchart of generating an image strip in accordance with certain embodiments of the presently disclosed subject matter. Upon acquisition of a runtime image, one or more edges can be identified (302) from the runtime image. For each identified edge, a set of image patches can be cropped (304) along a set of perpendicular lines with respect to the edge. The set of image patches can be combined (306) to form an image strip containing the edge.

Figure 6:
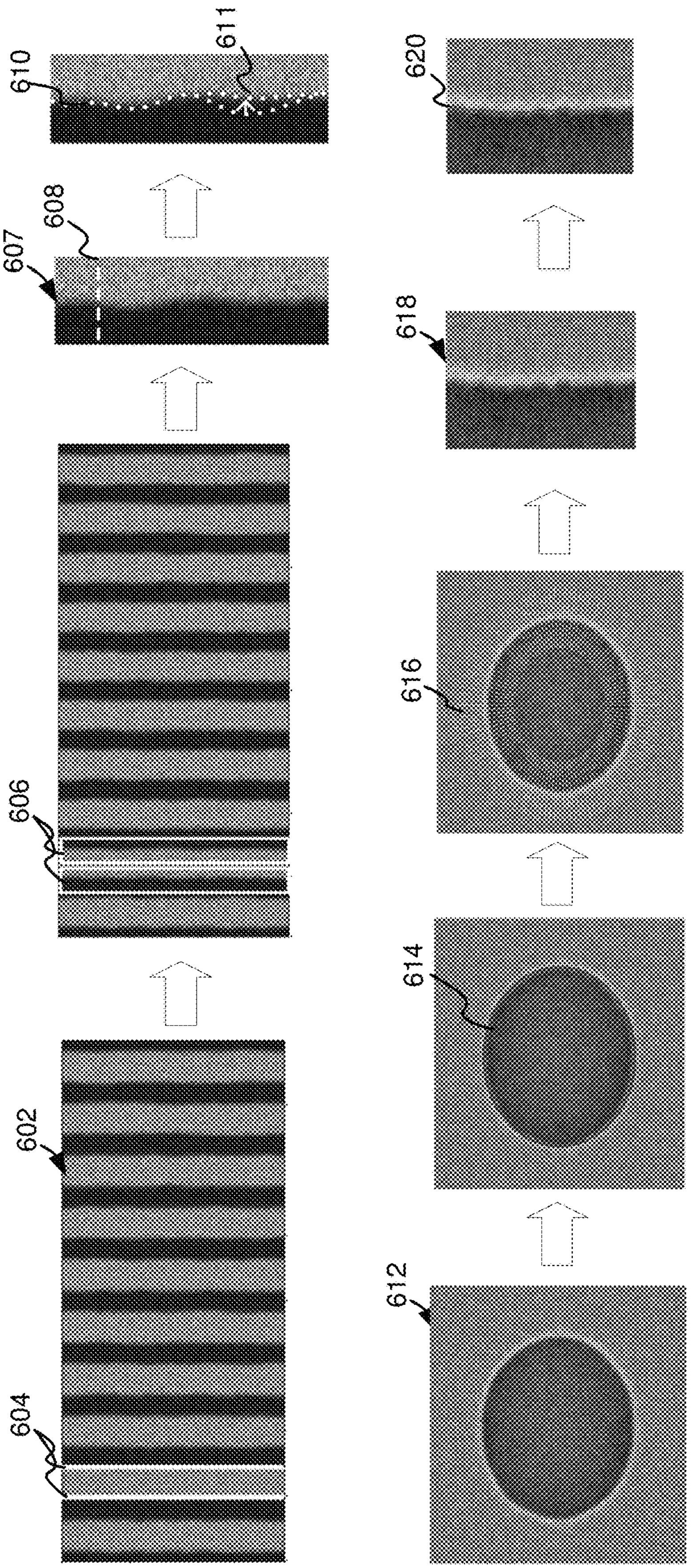
FIG. 6 illustrates examples of semiconductor specimen images containing different structures and the edge identification and topo point extraction thereof in accordance with certain embodiments of the presently disclosed subject matter.

As exemplified in FIG. 6, an image 602 capturing a plurality of line structures is illustrated. Edges of the line structures, such as denoted by 604, can be identified. Such identified edges are also referred to as coarse edges. By way of example, the coarse edges 604 of a line structure can be identified by obtaining derivatives of gray level profiles of the line structure along the direction across the line structure, and placing a line representative of an edge based on the averaged derivatives. Two image strips 606 are obtained, each containing an identified coarse edge 604.

In cases of line structures, the coarse edges are normally identified as straight lines. In such cases, the image strips can be cropped along the identified edges. In some other cases, such as illustrated in the image 612 which captures a circular structure, such as a contact, the coarse edge 614 for the contact is identified in a circular-like shape. In such cases, image strips cannot be directly cropped along the edge. According to certain embodiments, a set of perpendicular lines 616 with respect to the coarse edge 614 can be placed around the edge, as illustrated, and a set of image patches can be cropped along the set of perpendicular lines 616. The set of image patches can be combined to form an image strip 618 containing the edge 614.

The image strip 618 obtained as such can be regarded as "unwrapping" the circular edge 614 and the surrounding area thereof to a relatively straight edge in a rectangular strip shape, similar to the image strip 606 obtained for the line structures. This serves the purpose of easier processing for topo point extraction, as described below with reference to FIG. 4. Images of other shapes of structures, such as, e.g., ellipses, curved lines, or free forms, etc., can be processed in a similar manner so as to create image strips containing edges.

In some embodiments, optionally, instead of identifying the coarse edges on a runtime image as described above, the coarse edges can be identified/found by image registration performed between the runtime image and a training image. By way of example, the training image is associated (e.g., marked) with one or more locations of one or more coarse edges identified during training. The training image can be used as a reference image. Upon registration between the runtime image and the training image, the locations of coarse edges in the runtime image can be identified based on the locations of the coarse edges in the training image, and one or more image strips can be created from the runtime image based on the identified coarse edges. This can save the repetitive computation efforts in runtime for performing the edge identification and image strip creation, as described above.

FIG. 4 illustrates a generalized flowchart of extracting a set of topo points in accordance with certain embodiments of the presently disclosed subject matter. As shown, for each image strip, a plurality of gray level (GL) profiles can be generated (402) across the image strip (e.g., along a direction perpendicular to the longitudinal axis of the structure therein, one example of such a direction being illustrated by a dash line 608 across an enlarged view 607 of the image strip 606 in FIG. 6). The plurality of GL profiles can be generated at different locations across the image strip, e.g., in parallel to the dash line 608. For each GL profile, a location with the largest derivative can be identified (404)

along the GL profile (or a processed version thereof, such as a smoothed profile). In some embodiments, the location with the largest derivative can be used as the location of a topo point extracted on the contour of the edge.

In some embodiments, a range can be defined (406) along the GL profile (or a processed version thereof) that contains the location with the largest derivative. A location on the GL profile (or a processed version thereof) can be selected (408) within the range, corresponding to a topo point on the contour of the edge. In such a way, a plurality of topo points can be identified corresponding to the plurality of GL profiles. The plurality of topo points forms a sequence along the edge of a structure representing a fine contour of the edge.

Figure 7:
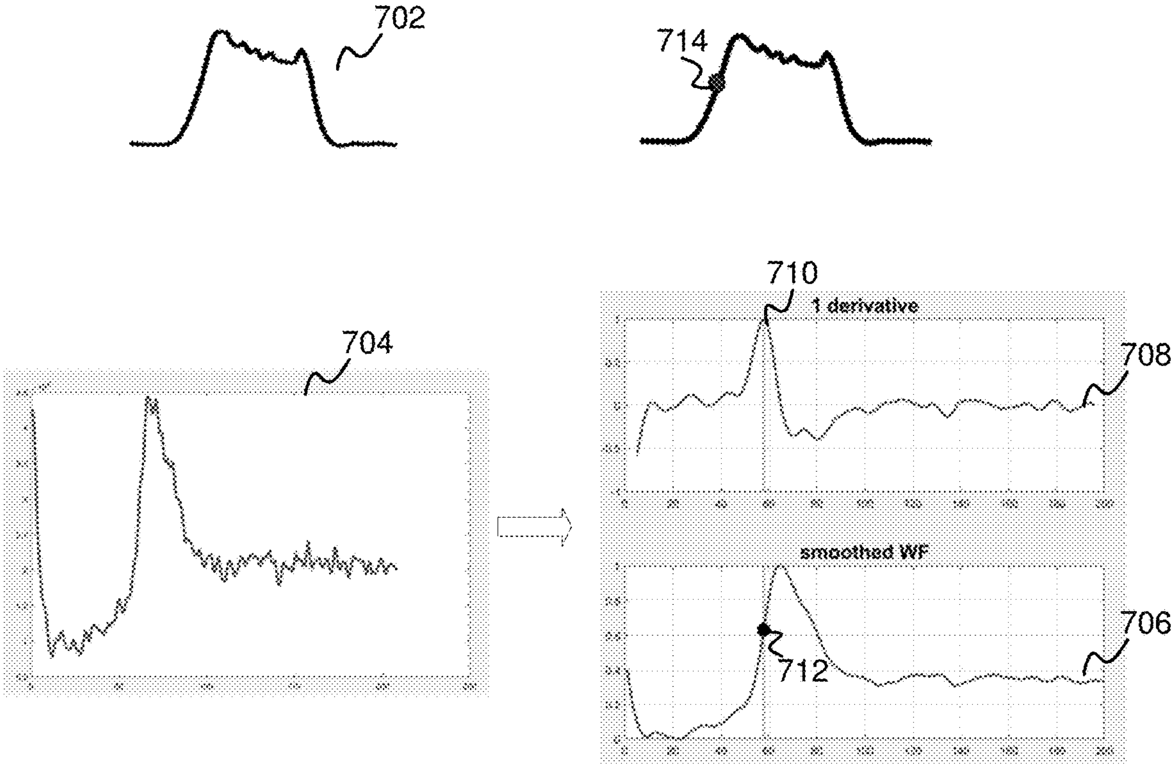
FIG. 7 illustrates a schematic illustration of the process of extracting a sequence of topo points in accordance with certain embodiments of the presently disclosed subject matter.

FIG. 7 shows a schematic illustration of the process of extracting a sequence of topo points in accordance with certain embodiments of the presently disclosed subject matter.

A line structure 702 such as captured in image 602 is illustrated in the figure from a cross-section view. A gray level (GL) profile 704 (illustrated as a waveform signal) is generated across the image strips 606 along the direction demonstrated by dash line 608 in FIG. 6. Based on the GL profile 704, a smoothed version 706 of the waveform of the GL profile 704 is generated (e.g., by noise filtration), and a derivative signal 708 of the smoothed waveform 706 is created. The peak 710 of the derivative signal 708 can be identified, representative of the location 714 with the maximum slope on the line structure 702. The peak 710 corresponds to a location 712 on the smoothed waveform 706. In some embodiments, the location 712 with the maximum derivative can be used as the location of a topo point extracted on the edge of the line structure. In some further embodiments, a range can be defined on the derivative signal 708 around the peak 710, and a location can be selected within the range, which corresponds to the location of a topo point.

Similarly, a plurality of topo points can be identified based on a plurality of GL profiles that are generated across the image strips 606 at different locations. The plurality of topo points forms a sequence 610 along the edge of the line structure representing a fine contour of the edge in the image strip 607, as illustrated in FIG. 6. A sequence of topo points 620 can be extracted representing a fine contour of the edge in the image strip 618 in a similar manner.

It is to be noted the definition of various parameters, such as, e.g., selection of the peak, range, etc., as illustrated in the above example, are for illustrative purposes only, and should not be regarded as limiting the present disclosure in any way. Such parameters can be configured differently corresponding to different structures.

It should be noted that FIGS. 3 and 4 only illustrate one possible way for topo point extraction for exemplary purposes, and should not be regarded as limiting the present disclosure in any way. Alternative image processing techniques can be used in lieu of the above for extracting a sequence of topo points representative of an edge, such as, e.g., image segmentation.

The term "image segmentation" generally refers to any process of partitioning an image into meaningful parts/segments (for example, background and foreground, noisy and non-noisy areas, various structural elements, defect and non-defect, etc.) whilst providing per-pixel or per-region values indicative of such segments. In some cases, image segmentation can be based on Machine Learning. By way of example, the image processing module 104 as illustrated in FIG. 1 can comprise a segmentation sub-module configured to segment the runtime image according to one or more structural elements (a structural element or feature used herein can refer to any original object on an image that has a geometrical shape or geometrical structure with a contour, or a combination of such objects) presented in the image, such as the line structures presented in the runtime image 602. The output of the segmentation module can be, for instance, a segmentation map in which the value of each pixel or sub-pixel is indicative of a predicted probability of a corresponding pixel/sub-pixel in the image belonging to the structural elements in the image, or, say, belonging to the background in the image. In such ways, the contour of the edges of a line structure can be identified based on the values in the segmentation map.

Continuing with the description of FIG. 2, once the sequence of topo points is obtained for each image strip, as described with reference to block 204, the sequence of topo points for each image strip can be provided (206) as an input to a trained machine learning (ML) model (e.g., the ML model 106) to be processed. A sequence of updated topo points can be obtained as an output of the ML model. By way of example, the input to the ML model can include the sequence of topo points as identified on each of the one or more image strips of the runtime image. In some cases, the locations of the sequence of topo points can be marked on the image strip, such as the sequence of topo points 610 marked in the image strip 607 as illustrated in FIG. 6, which are provided to the ML model as input. In some cases, the locations of the sequence of topo points can be stored as a list of coordinates and provided to the ML model as an input together with the image strip.

As described above, the ML model can be implemented using various model architectures. By way of example, the ML model can be implemented as a CNN. CNN normally has a structure comprising an input and an output layer, as well as multiple hidden layers. The hidden layers of a CNN typically comprise a series of convolutional layers, subsequently followed by additional layers, such as pooling layers, fully connected layers, and normalization layers, etc. In some cases, a CNN can be regarded as being composed of two main functionalities: feature extraction and classification. By way of example, the feature extraction part can include several convolutional layers followed by max-pooling and an activation function. The classification part usually includes fully connected layers. A convolutional layer in the feature extraction part comprises a set of learnable filters. Each filter of a specific layer can be convolved across the width and height of an input volume of a given input image, computing the dot product between the entries of the filter and the input, and producing an activation map which gives the responses of that filter at every spatial position. Stacking the activation maps for all filters along the depth dimension forms the full output feature maps of a given convolution layer. In such ways, the CNN learns of filters that activate when it detects some specific type of features at some spatial position in the input.

The ML model used in the runtime examination is previously trained during a training phase in accordance with the process detailed below with reference to FIG. 5.

Measurement data can be obtained (208) (e.g., by the measurement module 108) on the runtime image using the sequence of updated topo points. The measurement data can be obtained with respect to a specific metrology application. A metrology application refers to what a customer/user is interested to measure in general with respect to the specimen. By way of non-limiting example, a metrology application can be selected from a group of metrology applications comprising: Critical Dimension (CD) metrology, Overlay (OVL), Measurement-Based Inspection (MBI), Critical Dimension Uniformity (CDU), and Lithography process control.

CD metrology refers to measuring the critical dimensions of the fine patterns formed on a semiconductor wafer. The CD measurements include, but are not limited to, the following: dimensions (e.g., line widths, line spacing, contact diameters, size of the element, edge roughness, gray level statistics, etc.), shapes of elements, distances within or between elements, related angles, etc. Overlay refers to measurement of an overlay shift between multiple layer patterns. One example of overlay can be to find the nominal overlay error between two layers on the edge of the wafer. MBI refers to defect inspection using measurement. One example of MBI can be detection of etch residue at the bottom of a trench. CDU refers to uniformity measurement related to critical dimension. One example of CDU can be to create a uniformity map of the offset between two contacts. Lithography process control refers to control of a lithography tool and material roughness.

The measurement data obtained using the sequence of updated topo points has improved performance with respect to at least one metrology metric. By way of example, the at least one metrology metric is from a group comprising: precision, matching, correlation, and sensitivity, etc. The improved performance is realized via the training of the ML model, as detailed below with reference to FIG. 5.

Figure 5:
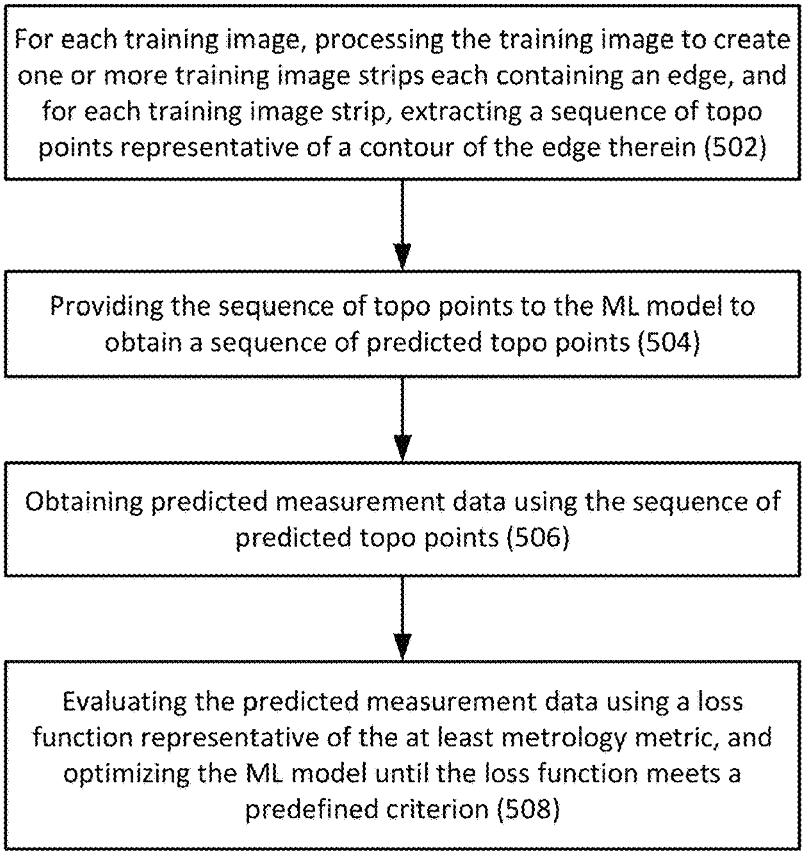
FIG. 5 shows a generalized flowchart of training a ML model usable for runtime examination in accordance with certain embodiments of the presently disclosed subject matter.

FIG. 5 shows a generalized flowchart of training a ML model usable for runtime examination in accordance with certain embodiments of the presently disclosed subject matter.

The ML model is trained using a training set comprising a plurality of training images of the specimen, and, optionally, the respective ground truth measurement data associated therewith. Each training image can be processed in a similar manner as described above with reference to block 204 of FIG. 2, prior to being fed into the ML model.

A training image can be a "real world" image of a semiconductor specimen obtained by an examination tool during a fabrication process thereof. In some embodiments, in addition to the "real world" training images, the training set used to train the ML model can be enriched by one or more synthetic images simulated for the semiconductor specimen.

Ground truth data is application specific. For instance, in cases where the metrology application is a CD measurement application, the ground truth measurement data can be representative of the actual/true CD measurements derived from the training images.

In some embodiments, the ground truth measurement data can comprise one or more of the following: measurement data generated by processing the training images using a reference metrology system, measurement data obtained from a customer based on a testing specimen, and measurement data automatically generated for simulated images (since the images are simulated based on design data which are typically associated with respective ground truth data of the structural elements thereof, the simulated images corresponding to the design data can also be associated with the respective ground truth data).

Specifically, the training image can be processed (502) to create one or more training image strips each containing an edge, and for each training image strip, a sequence of topo points can be extracted, representative of a contour of the edge. The sequence of topo points for each training image strip can be provided (504) to the ML model to be processed, so as to obtain a sequence of predicted topo points as the output of the ML model. The sequence of predicted topo points can be used (506) to obtain predicted measurement data on the training image. The predicted measurement data can be evaluated (508) using a loss function (also referred to as a cost function) representative of the at least metrology metric. The loss function refers to an overall or total loss function which may comprise one or more loss functions specifically configured to evaluate one or more metrology metrics. The ML model can be optimized until the overall loss function meets a predefined criterion.

As described above, the weighting and/or threshold values of the ML model can be initially selected prior to training, and can be further iteratively adjusted or modified during training to achieve an optimal set of weighting and/or threshold values in a trained ML model. After each iteration, depending on a specific loss function, a difference can be determined between the actual output produced by the ML model and the target output associated with the respective training data. The difference can be referred to as an error value. Training can be determined to be complete when one or more loss functions, indicative of one or more error values, are less than respective predetermined values, or when a limited change in performance between iterations is achieved (which can be predefined).

By way of example, the at least one metrology metric is from a group comprising: precision, matching, correlation, and sensitivity, etc., as will be explained in detail below.

Specifically, precision refers to the closeness of agreement between independent measurements (by the same metrology tool) on the same feature of the same area/site of a specimen. By way of example, high precision indicates that the independent measurements of the same feature are repeatable (i.e., the measurements have small variance with one another and the measurement distribution is relatively close). In some embodiments, precision can be regarded as measurement repeatability. In some other embodiments, precision can comprise two components: repeatability and reproducibility. Repeatability refers to a measure of measurement result distribution, where consecutive measurements are conducted repeatedly on the same site of the specimen, without any operator intervention. The cause for variation within repeated measurement results can be mainly due to the statistical nature of the tool signal (e.g., SEM signal), and interpretation of the new set of signals by the measurement algorithm as comprised in the recipe. Reproducibility refers to another measure of measurement result distribution, where the measurements are obtained from different sites of the same specimen at different times. It accounts for the other sources of variation between independent measurements: wafer alignment, SEM autofocus, pattern recognition, tool stability etc.

When evaluating the ML performance with respect to the training data, precision can indicate the repeatability of training measurement data of different training images acquired for a given feature (e.g., a structural feature from a given area/site of the specimen, or the same type of features from different areas/sites of the specimen) on the specimen by one metrology tool.

A loss function can be configured to evaluate the criterion of precision. By way of example, the loss function can be related to a precision score obtained by calculating variance between the training measurement data of different training images based on a precision measure.

By way of example, a loss function configured to evaluate precision can be exemplified as follows:

$$L_{precision} = \text{difference metric}(y_1, y_2, \ldots y_n)\left(p^i_{pred(A)}, y^i_{pred(B)}\right)$$

The $y_1$-$y_n$ represents the predicted measurements for n specific runs of scanning a given site or multiple sites. The ML model is optimized by minimizing the value of the cost function which represents a difference metric for evaluating the differences between the predicted measurements of the n specific runs. Similarly, as described above, the difference metric can be, e.g., the variance or any Lp-norm (p can be any integer) on the distance of each run's measurements to the multiple runs' average measurements, etc.

Matching refers to the metrology metric/benchmark representative of measurement variance between different tools, therefore is also referred to as tool-to-tool matching. Matching is thus, with respect to repeatability of training measurement data of different training images of the same given feature, acquired by different metrology tools. In order to evaluate such benchmarks, training images representing tool-to-tool variance, such as, e.g., training images acquired by different metrology tools, should be collected during the training data collection/preparation stage (e.g., the examination tools 120 may comprise multiple metrology tools). Various data collection schemes can be used for collecting training images acquired by different metrology tools, such as, e.g., ABBA, QC, for purpose of compensating variations caused by physical effects such as shrinkage and charging, etc.

A loss function for evaluating the criterion of matching can be similarly configured as described above, e.g., by calculating a difference between the training measurement data of different training images acquired by different metrology tools based on a matching measure.

By way of example, in the data collection scheme of ABBA, where two training subsets A and B are collected from two tools in an alternating manner, the loss function can be configured as follows.

$$L_{matching} = \text{difference metric}\left(p^i_{pred(A)}, y^i_{pred(B)}\right)\left(p^i_{pred(A)}, y^i_{pred(B)}\right)$$

The $$y^i_{pred(A)} y^i_{pred(A)}$$

represents the predicted measurement (i.e., training measurement data) for training image i from training subset A, and the $y^i_{pred(B)}$ $$y^i_{pred(B)}$$

represents the predicted measurement for a corresponding training image i from training subset $$B\left(y^i_{pred(A)}\right.\cdot$$

The ML model is optimized by minimizing the value of the loss function which represents a difference metric for evaluating the differences between the corresponding predicted measurements from the two (or more) training subsets. In some cases, the difference metric can be distance-based. Examples of such a difference metric can include, e.g., Lasso, Ridge regression, Lp-norm (p can be any integer), etc., which are also applicable to the cases of multiple tools (e.g., more than two tools). For instance, in the cases of multiple tools, it can be configured to minimize the distance of each tool's measurements to the average of all tools' measurements.

Correlation refers to the relationship between training measurement data of the training images and the respective ground truth measurement data associated therewith. A loss function for evaluating the criterion of correlation can be configured to represent the discrepancy between the training measurement data and the respective ground truth measurement data.

For purpose of evaluating correlation, ground truth measurement data need to be provided. By way of example, a cost function configured to evaluate correlation can be exemplified as follows:

$$L_{correlation} = \text{difference metric}(y_{true}, y_{pred})$$

The $y_{pred}$ represents the predicted measurements by the ML model. The $y_{true}$ represents the ground truth measurement data, such as provided by a reference metrology algorithm. The ML model can be optimized by minimizing the value of the loss function which represents a difference metric for evaluating the differences between the predicted measurements and the corresponding ground truth measurements.

Sensitivity refers to how sensitive the measurements are with respect to real physical changes of sizes of the features of a specimen. By way of example, if the feature of the specimen (e.g., width of a structural element) changes from 10 nm to 10.1 nm, high sensitivity indicates that the corresponding measurement should be sensitive to such change of scales, and the measurement result should reflect such change. In cases where the training set includes training images with changing sizes (such as synthesized training images simulated specifically with changing sizes of certain structural elements, as described above) and respective ground truth data thereof, sensitivity can be evaluated.

A loss function for evaluating the criterion of sensitivity can be configured, e.g., by estimating a linear regression function between the plurality of training measurement data and the associated ground truth data. By way of example, the linear regression can be estimated as, e.g., the training measurement data=gain*ground truth+offset.

In some cases, the ML model can be optimized to meet a specific metrology metric using a loss function directed to the specific metric. In some other cases, the ML model can be optimized to meet multiple metrology metrics, such as, e.g., matching, precision, sensitivity, and correlation. In such cases, a total loss function of the ML model can comprise various components of specific cost functions configured for specific metrics, where respective weights can be applied for the specific loss functions. For instance, the total loss function can be represented as follows:

$$L_{total} = \alpha_1 L_{correlation} + \alpha_2 L_{matching} \ \alpha_3 L_{precision} \ L_{totaal} = a_1 L_{precision} + a_2 L_{matching} + a_3 L_{correlation} + a_4 L_{sensitivity}$$

The ML model, once trained using the total loss function configured with the above components, can be used in runtime for processing input images from any tool and providing runtime measurements without tool-to-tool variance, while at the same time meeting the correlation, sensitivity, and precision requirements.

In some cases, optionally, one or more additional loss functions can be added in the total loss function, in addition to or in lieu of the above exemplified components, and the present disclosure is not limited to the specific representation and/or the number of components included in the total loss function.

In some embodiments, the criteria for the one or more metrology benchmarks can be predetermined in accordance with the customer's specification and/or based on previous examination experience.

Once the ML model is trained, the trained ML model can be used in runtime for updating the topo points to locations, which, when being used for performing runtime metrology operations, can provide runtime measurement data with improved performance with respect to the one or more metrology metrics.

As illustrated in FIG. 6, the original sequence of topo points 610 which serves as the input of the ML model, shows a slight deviation with respect to the bottom part of the edge of the line structure. After being processed, the sequence of updated topo-points shows that the topo points at the bottom part of the sequence have been updated to new locations 611 which match the actual edge more closely. Using the sequence of updated topo points can provide measurement data with better performance, e.g., in terms of high precision, matching and/or correlation, with respect to measurement data obtained using the original sequence of topo points. This is at least because the ML model is trained using a total loss function configured to specifically evaluate measurement performance with respect to these metrology metrics. By way of example, in cases where the total loss function includes a sub-loss function of matching, the ML model is trained to provide updated topo points that can be used to obtain measurements at least meeting the matching metric.

The present disclosed metrology system also provides improved explanability/interpretability as compared to the E2E type of learning model where the input to the model is the image and the output is directly the measurement data. By way of example, the present disclosed metrology system can visually demonstrate, via the location of the topo points, how the measurement data is obtained, thus enabling better understanding of the correlation between the runtime image and the topo points thereof and the measurement data obtained therefrom. This also allows easier tuning of the metrology algorithms, if needed.

The E2E learning model, on the other hand, works in a black-box manner. It is unlikely to find out how the measurement data is obtained from the input image, and which image characteristics may impact the measurements. This is particularly important in cases of GL variations and/or presence of potential pattern deviations in the runtime images, which may influence the measurements that the E2E model provides without the user knowing how exactly, whereas the presently disclosed metrology system, via the preprocessing of the runtime images, can demonstrate the influence of such variations to the selection of topo points, which provides additional "visual" input to the user and enables user intervention, if needed. The proposed method can provide topo points for all edges in all around the image, which enables to collect statistics such as, e.g., STD of CD measurements across the image.

It is to be noted that examples illustrated in the present disclosure, such as, e.g., the exemplified metrology applications, the exemplified metrology metrics, the various ways of extraction of topo points, etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein, is providing an optimized metrology system based on machine learning, which is capable of providing measurement data with improved performance in terms of at least one metrology metric such as, e.g., precision, matching, sensitivity, and/or correlation, with respect to measurement data obtained using the original sequence of topo points.

This is enabled by the pre-processing of the runtime images which provides initial topo points representative of edges in the images, and the capability of the ML model to process the initial topo points and provide updated topo points, which, when being used for metrology operations, can provide measurement data with improved performance, as described above. The ML model is trained specifically so as to enable such capability, as detailed above.

Among further advantages of certain embodiments of the presently disclosed subject matter as described herein is improved explanability/interpretability as compared to the E2E type of learning model. The present disclosed metrology system can visually demonstrate, via the location of the topo points, how the measurement data is obtained, thus enabling better understanding of the correlation between the runtime image and the topo points thereof and the measurement data obtained therefrom. This also allows easier user intervention and tuning of the metrology algorithms, if needed.

Among further advantages of certain embodiments of the presently disclosed subject matter as described herein is an optimized metrology system capable of providing runtime measurement data, with reduced tool-to-tool variance. This is enabled by training the ML model in the metrology system to at least meet the tool-to-tool matching metric using a training set and at least one cost function specifically configured therefor. Optionally, one or more additional cost functions can be added for training the learning model to meet the precision, sensitivity, and/or correlation metrics in addition to the tool-to-tool matching. The learning model trained in such a way can provide measurement data with reduced tool-to-tool variance while meeting the precision, sensitivity, and/or correlation criteria.

It is to be understood that the present disclosure is not limited in its application to the details set forth in the description contained herein or illustrated in the drawings.

In the present detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the present discussions, it is appreciated that throughout the specification discussions utilizing terms such as "obtaining", "examining", "providing", "training", "extracting", "generating", "processing", "using", "identifying", "cropping", "combining", "defining", "selecting", "evaluating", "optimizing", "performing", "creating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the metrology system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted, unless specifically stated otherwise, that the term "examination" or its derivatives used in this specification, is not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification, is not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the fabrication process, derivatives of the captured images/frames obtained by various pre-processing stages, and/or computer-generated synthetic images (in some cases based on design data). Depending on the specific way of scanning (e.g., one-dimensional scan such as line scanning, two-dimensional scan in both x and y directions, or dot scanning at specific spots, etc.), image data can be represented in different formats, such as, e.g., as a gray level profile, a two-dimensional image, or discrete pixels, etc. It is to be noted that in some cases the image data referred to herein can include, in addition to images (e.g., captured images, processed images, etc.), numeric data associated with the images (e.g., metadata, hand-crafted attributes, etc.). It is further noted that images or image data can include data related to a processing step/layer of interest, or a plurality of processing steps/layers of a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the present detailed description, numerous specific details are set forth in order to provide a thorough understanding of the methods and apparatus.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates s a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized metrology system for examining a semiconductor specimen, the system comprising a processing circuitry configured to:
- obtain a runtime image of a semiconductor specimen acquired by an examination tool;
- process the runtime image to create one or more image strips each containing an edge, and for each image strip, extract a sequence of topo points representative of a contour of the edge therein;
- provide the sequence of topo points for each image strip to a trained machine learning (ML) model to be processed, and obtain, as an output of the ML model, a sequence of updated topo points; and
- obtain measurement data on the runtime image using the sequence of updated topo points, wherein the measurement data has improved performance with respect to at least one metrology metric.

2. The computerized metrology system according to claim 1, wherein the at least one metrology metric is from a group comprising: matching, precision, correlation, and sensitivity.

3. The computerized metrology system according to claim 1, wherein the processing comprises identifying one or more edges from the runtime image, and for each edge, cropping a set of image patches along a set of perpendicular lines with respect to the edge, and combining the set of image patches to form an image strip containing the edge.

4. The computerized metrology system according to claim 1, wherein the extracting comprises for each image strip, generating a plurality of gray level (GL) profiles across the image strip, and for each GL profile, identifying a location with largest derivative along the GL profile corresponding to a topo point on the contour of the edge.

5. The computerized metrology system according to claim 1, wherein the ML model is previously trained during a training phase using a training set comprising a plurality of training images collected from at least one examination tool.

6. The computerized metrology system according to claim 5, wherein the training of the ML model comprises, for each training image:
- processing the training image to create one or more training image strips each containing an edge, and for each training image strip, extracting a sequence of topo points representative of a contour of the edge;
- providing the sequence of topo points to the ML model to process, and obtaining a sequence of predicted topo points;
- obtaining predicted measurement data using the sequence of predicted topo points; and
- evaluating the predicted measurement data using a loss function representative of the at least metrology metric, and optimizing the ML model until the loss function meets a predefined criterion.

7. The computerized metrology system according to claim 1, wherein the processing comprises performing image registration between the runtime image and a training image, the training image being associated with one or more locations of one or more edges identified during training, and creating the one or more image strips from the runtime image based on the one or more locations in the training image.

8. The computerized metrology system according to claim 1, wherein the improved performance of the measurement data is with respect to measurement data obtained using the sequence of topo points.

9. The computerized metrology system according to claim 1, wherein the improved performance of the measurement data further comprises robustness and interpretability with respect to measurement data obtained using an end-to-end learning model.

10. A computerized method of training a machine learning model usable for examining a semiconductor specimen, the method comprising:
- obtaining a plurality of training images collected from at least one metrology tool;
- for each training image, processing the training image to create one or more training image strips each containing an edge, and for each training image strip, extracting a sequence of topo points representative of a contour of the edge;
- providing the sequence of topo points to the ML model to process and obtaining a sequence of predicted topo points;
- obtaining predicted measurement data using the sequence of predicted topo points; and
- evaluating the predicted measurement data using a loss function representative of at least one metrology metric, and optimizing the ML model until the loss function meets a predefined criterion.

11. The computerized method according to claim 10, wherein the at least one metrology metric is from a group comprising: matching, precision, correlation, and sensitivity.

12. The computerized method according to claim 11, wherein the precision is indicative of repeatability of predicted measurement data of different training images acquired for a given feature on the specimen by one metrology tool, the correlation is between predicted measurement data of the training images and respective ground truth measurement data associated therewith, the matching is indicative of repeatability of predicted measurement data of different training images acquired for the given feature by different metrology tools, and the sensitivity is indicative of how sensitive the predicted measurement data is with respect to changes of sizes of the given feature.

13. The computerized method according to claim 10, wherein the processing comprises identifying one or more edges from the training image, and for each edge, cropping a set of training image patches along a set of perpendicular lines with respect to the edge, and combining the set of training image patches to form a training image strip containing the edge.

14. The computerized method according to claim 10, wherein the extracting comprises, for each training image strip, generating a plurality of gray level (GL) profiles across the training image strip, and for each GL profile, identifying a location with largest derivative along the GL profile corresponding to a topo point on the contour of the edge.

15. The computerized method according to claim 10, wherein a training image is associated with one or more locations of the one or more edges identified during training, and the training image is usable as a reference image for image registration with a runtime image so as to create one or more image strips from the runtime image based on the one or more locations in the training image.

16. The computerized method according to claim 10, wherein the ML model is trained for a specific metrology application from a group comprising: Critical Dimension (CD) metrology, Overlay (OVL), Measurement-Based Inspection (MBI), Critical Dimension Uniformity (CDU), and lithography process control.

17. A non-transitory computer readable storage medium tangibly embodying a program of instructions that, when executed by a computer, cause the computer to perform a method of examining a semiconductor specimen, the method comprising:

obtaining a runtime image of a semiconductor specimen acquired by an examination tool;

processing the runtime image to create one or more image strips each containing an edge, and for each image strip, extracting a sequence of topo points representative of a contour of the edge therein;

providing the sequence of topo points for each image strip to a trained machine learning (ML) model to be processed, and obtaining, as an output of the ML model, a sequence of updated topo points; and obtaining measurement data on the runtime image using the sequence of updated topo points, wherein the measurement data has improved performance with respect to at least one metrology metric.

18. The non-transitory computer readable storage medium according to claim 17, wherein the at least one metrology metric is from a group comprising: matching, precision, correlation, and sensitivity.

19. The non-transitory computer readable storage medium according to claim 17, wherein the processing comprises identifying one or more edges from the runtime image, and for each edge, cropping a set of image patches along a set of perpendicular lines with respect to the edge, and combining the set of image patches to form an image strip containing the edge.

20. The non-transitory computer readable storage medium according to claim 17, wherein the extracting comprises for each image strip, generating a plurality of gray level (GL) profiles across the image strip, and for each GL profile, identifying a location with largest derivative along the GL profile corresponding to a topo point on the contour of the edge.

* * * * *